No. 803,906.   PATENTED NOV. 7, 1905.
H. A. KEINER & E. C. WILLIAMS.
ICE CREAM DISHER.
APPLICATION FILED FEB. 2, 1905.
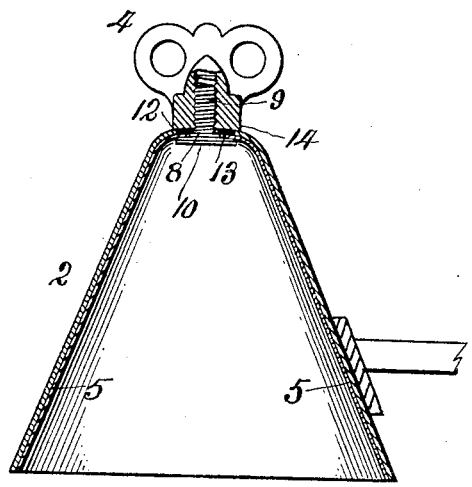
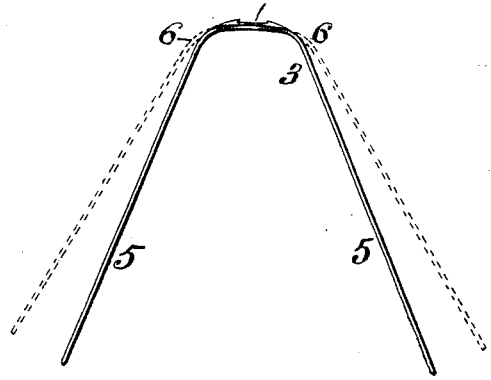
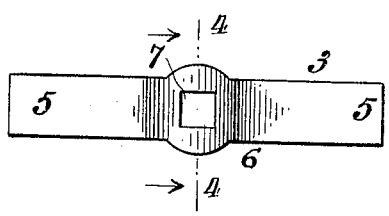
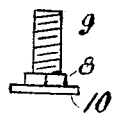
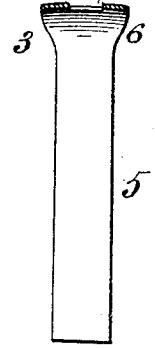
Witnesses
Edgeworth Greene
M. J. Mahony
Henry A. Keiner
Edward C. Williams  Inventors
By their Attorney H. A. West

UNITED STATES PATENT OFFICE.

HENRY A. KEINER AND EDWARD C. WILLIAMS, OF BROOKLYN, NEW YORK.

ICE-CREAM DISHER.

No. 803,906.  Specification of Letters Patent.  Patented Nov. 7, 1905.

Application filed February 2, 1905. Serial No. 243,852.

*To all whom it may concern:*

Be it known that we, HENRY A. KEINER and EDWARD C. WILLIAMS, citizens of the United States, and residents of Brooklyn, in the county of Kings and State of New York, have invented certain new and useful Improvements in Ice-Cream Dishers, of which the following is a specification.

Our invention relates to ice-cream dishers of the type wherein a rotary blade is employed for detaching the ice-cream from the walls of the receptacle; and the invention consists in the construction, arrangement, and combination of parts, all as hereinafter described and claimed.

In the accompanying drawings, to which reference is made and which form a part of this specification, Figure 1 is a sectional elevation of an ice-cream disher constructed in accordance with our invention. Fig. 2 is a side elevation of the blades removed from the receptacle, showing the blades spread in dotted lines. Fig. 3 is a top view of the same. Fig. 4 is a sectional view on line 4 4 of Fig. 3. Fig. 5 is a plan view bearing box or ring removed. Fig. 6 is a plan view of the screw removed.

In the drawings, 2 designates the main body or receptacle of the disher, preferably made of metal and in bell-shaped or conical form. 3 designates the rotary cutter, and 4 the key or handle by which the cutter may be turned in the receptacle for dislodging ice-cream packed therein. The cutter 3 is in the form shown and comprises two outwardly-diverging and thin and narrow arms or blades 5, which by outward spring action make close contact with the inner surface of the receptacle, so that when rotated they will cut or scrape the ice-cream clean from the said surface and enable the ice-cream to be deposited in shapely conical and measured portions upon a plate to be served. The arms or blades 5 from constant use and from forcible contact with the frozen cream adhering to the receptacle in time become feeble, and this defect can from time to time, as necessity requires, be corrected by removing the cutter from the receptacle and forcibly spreading the blades apart, as indicated in dotted lines in Fig. 2, the spreading being such that normally the blades will stand wider apart than the diameter of the receptacle, which should always be the case, so that when the cutter is pressed in and drawn back into the apex of the receptacle a spring tension will be put upon the blades, the same being exerted mainly at the shoulders 6, where the metal is somewhat wider to give sufficient strength. The center of the cutter is enlarged, as shown clearly in Fig. 3, and a key-opening 7, preferably in the form of a square hole, is formed therein to receive the correspondingly - shaped shank 8 of a beaded and screw-threaded key-bolt 9, the head 10 of the bolt being larger than the key-opening. A circular aperture 12 is formed in the apex of the receptacle 2, which aperture is larger than the key-opening 7 in the cutter, and in said aperture 12 is closely fitted an annular bearing box or ring 13, which is by preference of about the same thickness as the thickness of the material composing the receptacle 2. The screw-threaded portion of the key-bolt 9 passes through the bearing box or ring 13 and has the key or handle 4 screwed upon it. The head 14 of the key or handle 4 is larger than the annular box or ring 13 and larger than the aperture 12 in the receptacle, so that when screwed down it will extend beyond the ring 13 and cover that portion or edge of the receptacle adjacent to the aperture 12. In this way when the parts are put in place and the key or handle is screwed down it will cause the key-bolt to forcibly draw inward the cutter, causing the blades of the cutter to be closed toward each other from contact with the conical walls of the receptacle and finally to bind the cutter upon the square key-shank 8 of the bolt 9 and confine the operative parts in central position in the apex of the receptacle.

Having thus described our invention, what we claim as new, and desire to secure by Letters Patent, is—

The cutters having an opening therein, a headed screw-bolt passed up through said opening, a ring on said screw-bolt above the cutters, a receptacle having an aperture to receive the said ring, and a handle screwed upon said bolt at the outside of the receptacle and formed with a head larger in diameter than that of the said ring, substantially as described.

HENRY A. KEINER.
EDWARD C. WILLIAMS.

Witnesses:
JNO. G. WISCHERTT,
ADAM SCHAUF.